(No Model.)
J. P. REILY.
SLEEVE PROTECTOR.
No. 569,472. Patented Oct. 13, 1896.
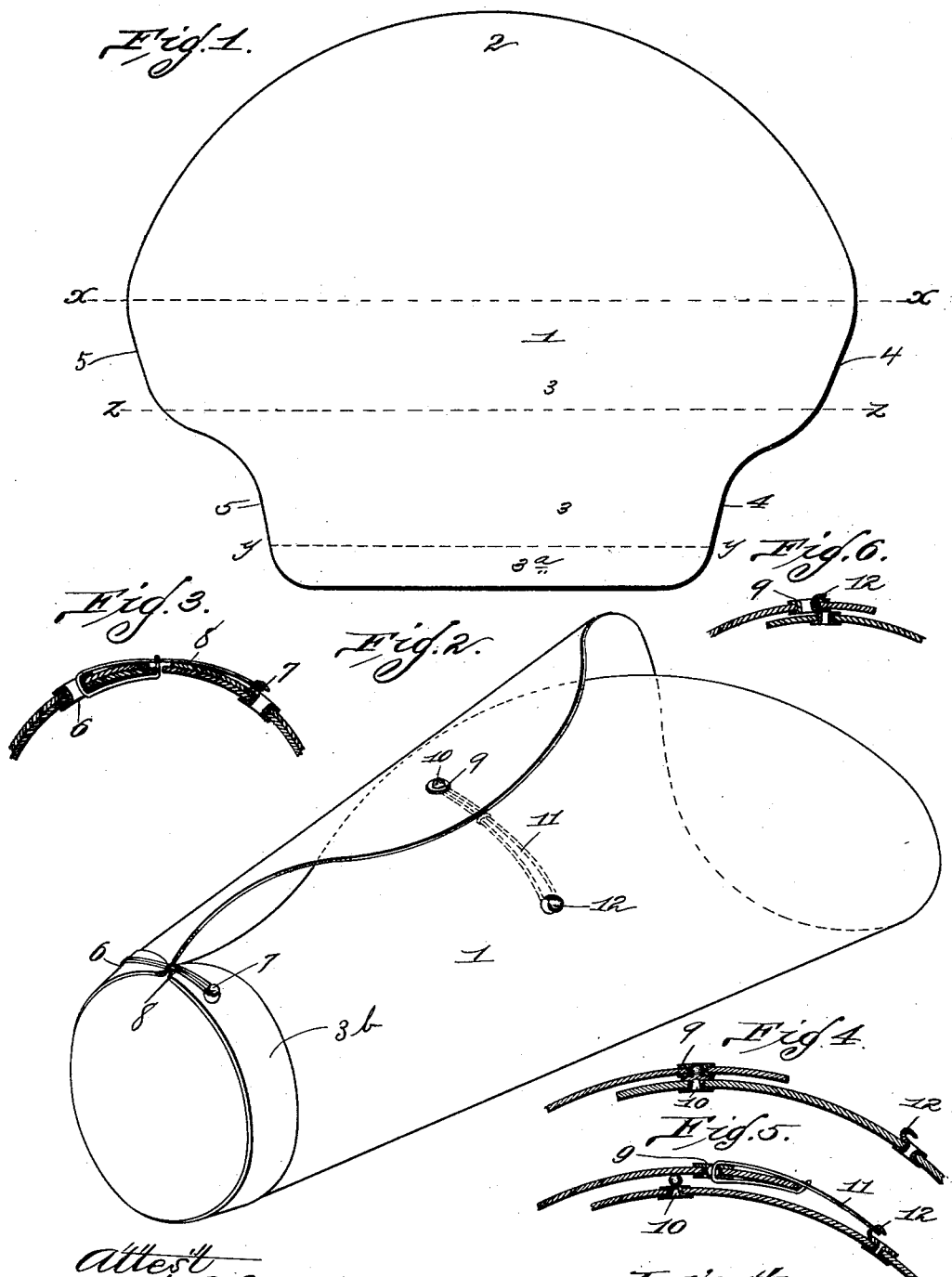

UNITED STATES PATENT OFFICE.

JOHN P. REILY, OF ST. LOUIS, MISSOURI, ASSIGNOR OF TWO-THIRDS TO WILLIAM B. ADDINGTON AND CHARLES W. BLOCK, OF SAME PLACE.

SLEEVE-PROTECTOR.

SPECIFICATION forming part of Letters Patent No. 569,472, dated October 13, 1896.

Application filed April 27, 1896. Serial No. 589,311. (No model.)

*To all whom it may concern:*

Be it known that I, JOHN P. REILY, of the city of St. Louis, State of Missouri, have invented certain new and useful Improvements in Sleeve-Protectors, of which the following is a full, clear, and exact description, reference being had to the accompanying drawings, forming a part hereof.

My invention relates to a sleeve-protector; and it consists in the novel construction, combination, and arrangement of parts hereinafter shown, described, and claimed.

My present invention is an improvement upon the invention shown in my former application, filed March 10, 1896, Serial No. 582,670, and pending concurrently herewith.

Figure 1 is a plan view of a sheet of material cut or stamped into a shape to form my improved sleeve-protector. Fig. 2 is a perspective of my completed sleeve-protector. Figs. 3, 4, 5, and 6 are transverse sectional views showing the details of the fastening devices and the method of attaching the same to the sleeve-protector.

The blank 1 is cut or stamped from cardboard, stiff paper, linen paper, or other suitable material, in approximately the form shown in Fig. 1. The end 2 of said blank above the line $x$ $x$ is substantially semicircular in form, while the opposite end $3^a$ below the line $y$ $y$ is substantially straight on its lower edge, and the side edges 4 and 5 of the portion 3 between the lines $y$ $y$ and $z$ $z$ are irregular, being nearly parallel for a short distance above the line $y$ $y$. Below said line $y$ $y$ the corners of the blank are rounded. The upper ends of the lines 4 and 5 below the dotted line $z$ $z$ are considerably flared outwardly and the border lines of the blank from the line $z$ $z$ to the line $x$ $x$ are much less flared or more nearly parallel than are the border lines immediately below said line $z$ $z$.

The blank 1 is rolled into a tube, as shown in Fig. 2, and the end $3^a$ of said blank below the dotted line $y$ $y$ is turned outwardly and backwardly and pasted to the portion 3 of the blank, thus forming the wristband $3^b$.

An eyelet 6 is inserted near one end of the wristband $3^b$ and a hook 7 is fixed to the opposite end. An ordinary elastic band 8 is tucked through the eyelet 6 and one end of the band is tucked through the loop formed by the other end of the band and is left free to be looped around the hook 7, thus forming an elastic connection between the meeting edges of the wristband of the sleeve-protector. At approximately the longitudinal center of the sleeve-protector, or about on the line $x$ $x$, and a slight distance inside of the edge of the blank 1 an eyelet 9 is inserted, and a stud 10 is fixed in the opposite edge of the blank and in alinement with said eyelet and designed to be engaged by said eyelet. One end of an elastic band 11 (shown in dotted lines in Fig. 2) is tucked through the eyelet 9 and then tucked through the loop formed at the other end of said band and is free to engage the hook 12, which is inserted in said blank some distance from the stud 10 and in transverse alinement therewith.

An eyelet or a rivet may be inserted in place of the glove-fasteners 9 and 10 through both edges of the sleeve-protector and left loose enough so that said edges may operate as on a pivot, as before described, and thereby the necessity for the eyelet 9, the stud 10, the band 11, and the hook 12 is obviated.

When it is desired to place the sleeve-protector in position upon the arm of the wearer, the elastic band 8 may be unhooked and the hand inserted in the upper end of the device and down through the wristband without removing the eyelet 9 from the stud 10, and during this operation the eyelet acts as a bearing upon said stud, forming a pivotal connection between the two edges of the sleeve-protector, thus allowing the wristband to open up as required to allow the hand to pass through and then to contract again around the wrist as required to allow the device to assume its natural position upon the arm. The pivotal connection formed by the eyelet and the stud 10 is of special convenience and importance in this connection, as it renders the unhooking or opening up of the device unnecessary when it is desired to place it in position upon the arm. Any device which forms a pivotal connection between the meeting and overlapping edges of the blank 1, and thus allows of the expansion and contraction of the wristband, as heretofore suggested, may be substituted for the connections herein shown and described.

Should the device prove too small for the wearer, or too large, the stud 10 may be removed from the eyelet 9 and the elastic band 11 used in place thereof, as before described, and as shown in detail in Fig. 5.

The glove-fastening may be entirely omitted, and the elastic band 11 will fulfil all of the requirements in most instances. In some cases it may be found desirable to omit the stud 10 and to have the eyelet 9 engage the hook 12, as shown in Fig. 6. The only essential in this respect is that the connection upon the line $x\,x$ between the two edges of the sleeve-protector shall be of the nature of a pivot, as hereinbefore described.

I claim—

In a sleeve-protector, the blank 1 cut from paper and rolled into the form of a tube; said blank consisting of the end 2 which is substantially semicircular in form, the end $3^a$ which is substantially straight with rounded corners and turned outwardly and backwardly to form the wristband $3^b$, and the portion 3 connecting the said end 2 and said end $3^a$ and having the irregular edges 4 and 5, in combination with the eyelet 6 inserted near one end of the wristband $3^b$, the hook 7 inserted near the opposite end of said wristband and the elastic 8 inserted in said eyelet 6 and connecting said eyelet with said hook, substantially as specified.

In testimony whereof I affix my signature in presence of two witnesses.

JOHN P. REILY.

Witnesses:
S. G. WELLS,
MAUD GRIFFIN.